United States Patent

[11] 3,604,933

[72] Inventors Leslie E. Cross;
Eugene P. Lunghofer, both of State College, Pa.
[21] Appl. No. 789,815
[22] Filed Jan. 8, 1969
[45] Patented Sept. 14, 1971
[73] Assignee The Carborundum Company
Niagara Falls, N.Y.

[54] ELECTROMAGNETIC RADIATION-DETECTION DEVICE COMPRISING FERROELECTRIC SENSING, REFERENCE AND TEMPERATURE-STABILIZING COMPONENTS
21 Claims, 9 Drawing Figs.
[52] U.S. Cl. .................................................. 250/83.3
[51] Int. Cl. .................................................. G01t 1/16
[50] Field of Search .......................................... 250/83.3
IR, 83.3

[56] References Cited
UNITED STATES PATENTS

| | | | |
|---|---|---|---|
| 3,313,937 | 4/1967 | Hadni .......................... | 250/83.3 X |
| 3,453,432 | 7/1969 | McHenry ...................... | 250/83.3 |
| 3,453,434 | 7/1969 | Takami et al. ................. | 250/83.3 |

*Primary Examiner*—James W. Lawrence
*Assistant Examiner*—Davis L. Willis
*Attorney*—K. W. Brownell

ABSTRACT: An electromagnetic radiation detection device having increased sensitivity comprises ferroelectric crystalline sensing and reference components, temperature stabilized with a ferroelectric TANDEL at a temperature near a crystallographic transition temperature of the ferroelectric crystalline material used. The device has wide application wherever sensitive electromagnetic radiation detectors are required. Two embodiments are described having varying complexity and sensitivity.

PATENTED SEP 14 1971

INVENTORS
LESLIE E. CROSS
EUGENE P. LUNGHOFER

BY K.W.Brownell

INVENTORS
LESLIE E. CROSS
EUGENE P. LUNGHOFER
BY
K. W. Brownell

INVENTORS
LESLIE E. CROSS
BY EUGENE P. LUNGHOFER

ELECTROMAGNETIC RADIATION-DETECTION DEVICE COMPRISING FERROELECTRIC SENSING, REFERENCE AND TEMPERATURE-STABILIZING COMPONENTS

BACKGROUND OF THE INVENTION

This and other objects relates accomplished with an electromagnetic radiation detection device. More particularly, it relates to an electromagnetic radiation detection device utilizing a ferroelectric crystalline sensing and reference components, temperature stabilized with a ferroelectric TANDEL. Electromagnetic radiation detection devices (for example, infrared or IR detectors) include a wide variety of instruments for determining the existence or measuring the magnitude of electromagnetic radiation of various objects. For example, infrared thermal photographs are useful in medical and biological investigations, and can be of use in detecting disease. Thermal photographs are useful in determining temperature distribution in jet and rocket engines in static tests, and are a valuable aid in testing models in wind tunnels, since the heating effects under supersonic and hypersonic conditions are graphically indicated. Heating and cooling systems can be checked for operating efficiency and uniformity. Nondestructive testing of castings, honeycomb structures, continuous welds and the like is possible by heating or cooling an item to be tested and observing thermal patterns to disclose internal faults. Radiation detectors are used in missile and space vehicle instruments, for example tracking sensors, satellite spectrometers, space navigation sensors and star trackers. Weather prediction is possible by measuring cloud cover at night, temperature and composition of the earth's atmosphere. IR detectors are useful in detecting overheating of mechanical devices, such as overheated axles of railroad trains caused by lubrication failure.

Detection of infrared radiation of wave lengths from 0.8 to 30 microns has previously been most successfully accomplished with the thermistor bolometer, the thermopile, and the Golay cell. More recently, pyroelectric materials have been used as IR detectors. All four types have specific advantages.

The thermistor comprises an oxide material with a negative coefficient of resistance. Its sensitivity, time constant and impedance have resulted in its being a most useful detector. In order to obtain maximum sensitivity with such a device, however, it is necessary to operate the detector in a bridge network with a bias voltage applied. The bias voltage can act as a noise source, however, which limits the application of the detector.

Thermopiles have the advantage of not requiring a bias voltage, and they produce DC voltage as a function of incident radiation. They have an output on the order of microvolts at a very low impedance. To operate such a detector it is necessary to chop the output and amplify it through an AC amplifier. In applications where resistance to shock and vibration is required, a photodiode chopper is necessary. Long term stability with ambient thermal variation is difficult with this type of chopper. The use of a mechanical chopper overcomes this difficulty, but a mechanical chopper is not practical in a vibration environment.

The Golay cell is more sensitive than either the thermistor or the thermopile; however, it has an extremely long time constant which limits its utility to situations in which a long integration time is permissible.

To overcome the disadvantages of the thermistor, the thermopile, and the Golay cell, pyroelectric materials have recently been used to construct IR detectors. A pyroelectric material is a crystal which has the capacity for a spontaneous polarization, i.e. a polarization which, once induced, remains in the absence of either an applied electrical field or an external stress. An ordinary dielectric, in contrast, exhibits polarization only while such a field or stress is applied.

The magnitude of the spontaneous polarization that exists at a given time in a given pyroelectric material is temperature dependent. The temperature dependence of the spontaneous polarization of pyroelectric materials is utilized in pyroelectric electromagnetic radiation detectors. Radiation to be measured is focused on a pyroelectric crystal. If the crystal is thermally isolated from its environment, the crystal temperature will change, due to the energy it absorbs from the incident radiation. This absorption of energy can be accomplished by either a direct internal absorption process or by energy transfer from a secondary absorbing and reradiating film which may be coated upon the crystal surface. In either case, there results both (1) a temperature change whose magnitude is proportional to incident radiation intensity, and (2) a thermally induced change in the amount of spontaneous polarization of the crystal. Further details of the pyroelectric detector are reported, for example, by H. P. Beerman, Pyroelectric Infrared Radiation Detector, Ceramic Bulletin, 46, 737—40 (1967).

Ferroelectric materials (or simply "ferroelectrics") are a subset of the class of pyroelectric materials, and they are highly useful for pyroelectric detector elements. A ferroelectric material is a pyroelectric material whose polarization can, as a result of the crystallographic structure of the ferroelectric, be reversed (switched) by application, in a direction opposite to the direction of polarization, of an electric field of sufficient strength. A characteristic property of a ferroelectric material is the existence of one or more crystallographic transition temperatures at which the ferroelectric transforms to another crystallographic structure. The crystallographic structure into which the ferroelectric is transformed is, in some cases, another polar structure; but most often it is a nonpolar structure, and the crystal loses its polarity. When the crystal is brought back to its previous temperature, the crystal is again polarized, but not uniformly, nor in only one direction. On the contrary, a ferroelectric crystal which is heated (or cooled) into a nonpolar region, and then cooled (or heated) back into a ferroelectric region usually displays a net polarization of zero. This process is known as "depoling," and it destroys the sensitivity of a detector which requires a polarized detector element.

In the neighborhood of such crystallographic transition temperatures, ferroelectrics characteristically show marked nonlinear, anomalous enhancement of their electrical properties, such as their capacitance, pyroelectric coefficient and piezoelectric modulus, typically orders of magnitude larger than those which are characteristic of the same substance at another temperature or of an analogous nonferroelectric compound. This anomalous enhancement of the pyroelectric coefficient of a ferroelectric material within a transition temperature zone allows existing pyroelectric detectors to compete with previously described radiation detectors. Presently available commercial detectors employ, for example, triglycine sulfate, $(NH_2CH_2CO_2H)_3 \cdot H_2SO_4$, (T.G.S.) as a detector element. T.G.S. is a ferroelectric below about 49° C. and undergoes a second order crystallographic transition at about 49° C. to a nonpolar, paraelectric form.

For the purposes of further discussion, the term "transition temperature zone" is defined as the temperature range within which a ferroelectric crystalline material exhibits enhanced electrical properties. The "transition temperature" is the temperature at which crystallographic transformation occurs.

As the temperature of a pyroelectric detector nears the transition temperature, its pyroelectric coefficient, and hence the sensitivity of the detector, tend to increase rapidly. However, existing pyroelectric detectors are not operated near the transition temperature, but are more typically stabilized well below that temperature (in the case of T.G.S., about 40° C.). There are two chief reasons which dictate a lower, less sensitive operating temperature. First of all, there is the practical difficulty of designing a compact temperature stabilization device by conventional methods that will provide the necessary thermal stability (about $1 \times 10^{14}$ Centigrade degrees) to allow operation just below the transition temperature. Secondly, even with such a device, operation of a ferroelectric pyroelectric detector at the transition temperature is not desirable because of the danger that the crystal will exceed the transition temperature, in which event the polarity of the crystal would be lost. Even if the transition temperature were exceeded briefly, as for example when the thermostat accidentally exceeds, however slightly, the transition temperature, or when the electromagnetic radiation being measured exhibits an increase in magnitude sufficient to raise the pyroelectric element above its transition temperature, the spontaneous polarization would be lost. Once lost, lowering the temperature will not return the same net spontaneous polarization, but the detector must be disassembled and the element repolarized, or replaced.

Thus, although a pyroelectric detector can be theoretically made extremely sensitive by utilizing the large pyroelectric coefficient of a ferroelectric crystal in the transition temperature zone, this sensitivity has not previously been realized due to the possibility of accidental depoling of the element as well as due to the practical difficulties of temperature stabilization by conventional techniques.

SUMMARY OF THE INVENTION

It is, therefore, an object of this invention to provide an electromagnetic radiation detection device having increased sensitivity to electromagnetic radiation as compared to existing detectors.

Another object is to provide a radiation detector capable of utilizing the anomalous enhancement of electrical properties, without danger of loss of sensitivity due to accidental depoling of the detector element.

A further object is to provide a new and useful process for measuring the magnitude of electromagnetic radiation.

These and other objects are accomplished with an electromagnetic radiation detection device, comprising:

1. an electromagnetic radiation sensing component, comprising:
   a. at least one ferroelectric crystalline electromagnetic radiation sensing element,
   b. at least one ferroelectric crystalline reference element, the number of sensing and reference elements being equal, and the sensing and reference elements being composed of the same basic ferroelectric crystalline material, and
   c. means for comparing temperature dependent properties of the sensing and reference elements; and
2. means for maintaining the sensing and reference elements within about 0.1 Centigrade degrees of crystallographic transition temperatures of the sensing and reference elements.

BRIEF DESCRIPTION OF THE DRAWINGS

FIG. 2 passes through line 2—2 of FIG. 3.

DETAILED DESCRIPTION

Figure 1:
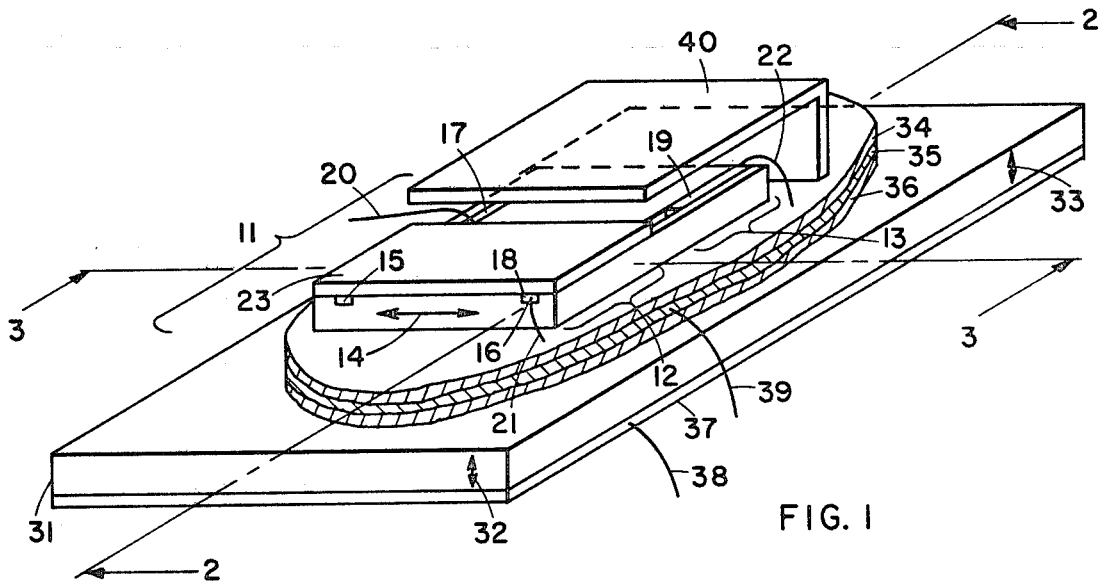
FIG. 1 is a schematic perspective view of a first preferred embodiment of the invention, in which the capacitances of a single sensing element and a single reference element are compared, both elements being portions of a single ferroelectric crystalline body.

Before describing the preferred embodiments in detail, it is desired to make clear the following terminology used in the description.

A "ferroelectric crystalline" material or element is a material or element which, in at least one crystalline state, exhibits reversible spontaneous polarization. Although the ferroelectric crystalline material will exhibit reversible spontaneous polarization only between the appropriate transition temperatures (i.e., while the ferroelectric material is in its ferroelectric state), the term "ferroelectric crystalline" is used to designate the material not only in the ferroelectric state, but also in the "transition temperature zones" mentioned above which surround the transition temperatures themselves, and in which zones the ferroelectric crystalline material exhibits enhanced electrical properties.

A "ferroelectric crystalline element" is a portion of ferroelectric material which performs a particular function, e.g. sensing electromagnetic radiation, serving as a reference for comparison purposes, or stabilizing temperature of other elements.

A "crystalline body" is a single piece of crystalline material, as used in a radiation detection device, and which can contain one or more elements.

A "growth crystal" is a piece of crystalline material as grown from solution, before the crystal is cut up into crystalline bodies for use in detection devices. Crystalline bodies derived from the same growth crystal tend to have more closely similar properties than those which are not.

A "basic ferroelectric material" is a substance having a particular gross composition, e.g. triglycine sulfate or triglycine sulfate/fluoberylate with a particular approximate ratio of sulfate to fluoberylate. Crystalline bodies which are composed of the same basic ferroelectric material (1) can include varying amounts of minor compositional inclusions (e.g. deuterium oxide) for the purpose of modifying properties of one or more of the crystalline bodies; or (2) can contain slightly varying ratios of components, in the case of mixtures of two or more similar materials. A "specific ferroelectric material" is a substance without this latitude of approximate composition.

The "directions of ferroelectric axes" are the directions in which polarization of a ferroelectric material can exist. Some crystals have only a single ferroelectric axis (e.g. triglycine sulfate), in which case the crystal can exhibit spontaneous polarization in only two directions (each direction along the single axis); other crystals have multiple ferroelectric axes, so that spontaneous polarization can exist in several directions. Materials with a single ferroelectric axis are preferred for use in the present invention. "Capacitance in the direction of a ferroelectric axis" is the capacitance measured between electrodes which are substantially perpendicular to the axis.

Crystallographic transitions are traditionally classified as "first order" or "second order," depending on the nature of the transition. "First order" transitions are those in which energy, volume and various other physical properties change discontinuously. "Second order" transitions are those in which energy, volume and various other physical properties change continuously. The term "weak first order" transition is recognized in the art to include borderline cases, in which a small discontinuity exists, but, because the discontinuity is small, the transition can for some purposes be classified with second order transitions. Also classified as weak first order transitions are those which cannot clearly be classified as either first or second order, because of lack of physical data.

"Centigrade degrees" are used to designate temperature changes, or permissible ranges of variation; "C" is used to designate temperatures.

Two preferred embodiments of the invention are illustrated in the drawings. FIGS. 1-5 schematically illustrate a first preferred embodiment in which capacitances of a single electromagnetic radiation sensing element and a single reference element are compared, both elements being portions of a single crystalline body. An operationally equivalent structure comprises a crystalline body for each element; in this event, both sensing and reference elements are preferably composed of the same specific ferroelectric material, and preferably derived from the same growth crystal. Incorporation of the sensing and reference elements in to one crystalline body is preferred, however.

Referring specifically to FIG. 1, a first ferroelectric crystalline body 11 comprises an electromagnetic radiation sensing element 12 and a reference element 13. Materials which can be utilized for this and other ferroelectric crystalline bodies recited herein, both in the description of this and the second embodiment, include, for example, triglycine sulfate, triglycine fluoberylate, barium niobate, strontium niobate, and potassium tartrate tetrahydrate. Mixtures of similar materials can be employed for example of triglycine sulfate and triglycine fluoberylate, or of barium niobate and strontium niobate. It is preferred that the material have a single ferroelectric axis, and that it have either a second order or weak first order crystallographic transition.

The direction of a ferroelectric axis (preferably, the only such axis) is shown by double-headed arrow 14. Grooves 15 and 16 are formed in the crystalline body 11, substantially perpendicular to the axis represented by arrow 14, for example by means of a hot wire. Electrodes 17, 18 and 19 are deposited within grooves 15 and 16, for example by masking the top of the crystal in the areas where electrodes are not desired and evaporating gold onto the crystal by known techniques. A space is provided between electrodes 18 and 19, so that the capacitances of the sensing and reference elements can be measured between electrode pairs 17/18 and 17/19, respectively. The electrodes are then adjusted so that approximately equal capacitances (at least within about 1 percent, preferably within about 0.1 percent) are observed between each pair (17/18 and 17/19) of electrodes. Alternatively, the end surfaces can be electroded, but grooving is preferred for its convenience.

Electrodes 17, 18 and 19 are next provided with leads 20, 21 and 22, respectively, which are connected in such a way as to minimize interlead capacitances, according to methods known in the art.

Sensing element 12 is shown provided with an optional electromagnetic radiation absorptive and reradiating coating 23. By varying the coating, the wavelength of radiation to be detected is varied. For example, carbon black absorbs a wide spectrum of light, and reradiates the energy absorbed into sensing element 12. Petroleum jelly, on the other hand, preferentially absorbs ultraviolet radiation.

Temperature stabilizing element 31 constitutes a second ferroelectric crystalline body. The direction of a ferroelectric axis is shown by double-headed arrows 32 and 33. The temperature stabilizing element 31 is electrically insulated from, but thermally connected to, the sensing and reference elements 12 and 13 by means of electrically insulating, thermally conductive sheet 34 which is coated with electrically conductive, thermally conductive sheet 35. Examples of materials suitable for such use are poly(ethylene terephthalate), sold under the trade name "Mylar" (among others) for sheet 34, and gold for sheet 35. Other suitable films can of course be used.

On each side of temperature stabilizing element 31 are shown electrodes 36 and 37. Upper electrode 36 can be formed by coating gold onto element 31; or, alternatively, by use of an electrically conductive, thermally conductive cement (e.g., containing suspended colloidal silver). In the former event, preferred because better electrical contact is obtained, electrode 36 is attached to sheet 35 by means (not shown), such as electrically conductive cement, which will not prevent electrical contact between sheet 35 and electrode 36. Lower electrode 37 is likewise preferably formed by gold coating.

Electrodes 36 and 37 are then supplied with leads 38 and 39 to provide means for subjecting the temperature stabilizing element 31 with an alternating electric field. Lead 38 is advantageously connected directly to electrode 37, but lead 39 is preferably connected to electrically conductive sheet 35.

Crystalline body 11, comprising sensing and reference elements 12 and 13, is attached to electrically insulating sheet 34, for example with thermally conductive cement (not shown). Electromagnetic radiation shield 40 is attached to sheet 34, so as to shield reference element 13 from radiation.

Figure 2:
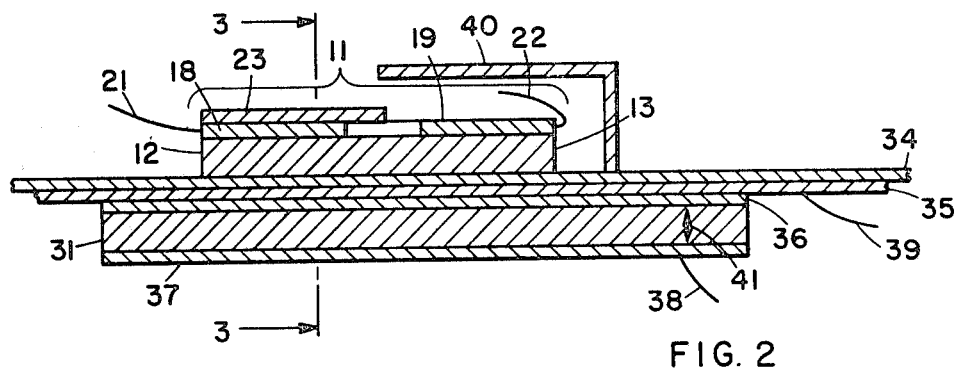
FIG. 2 is a vertical sectional view of the embodiment shown in FIG. 1, taken along line 2—2 of FIG. 1.
Figure 3:
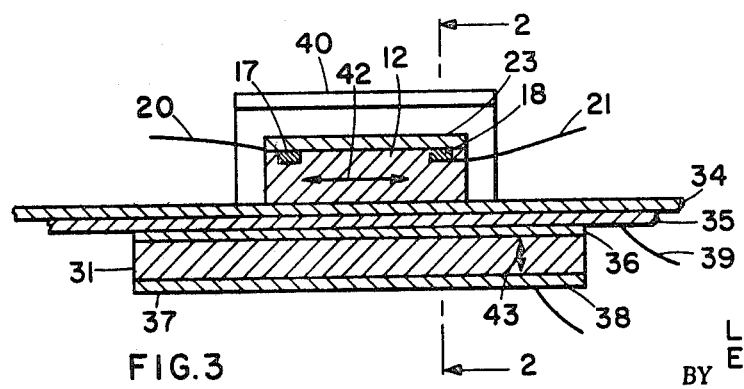
FIG. 3 is a vertical sectional view of the same embodiments taken along line 3—3 of FIG. 1 and line 3—3 of FIG. 2.
Figure 4:
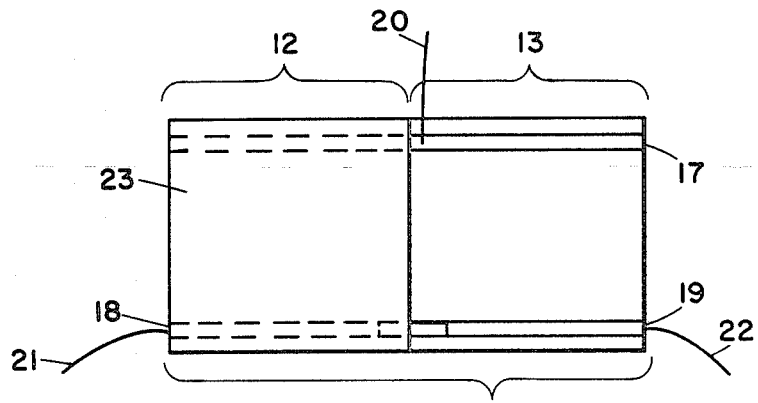
FIG. 4 is a plan view of the ferroelectric crystalline body of FIGS. 1-3 which comprises the sensing and reference elements of the detector.

FIGS. 2 and 3 are vertical sectional views of the apparatus of FIG. 1, in which directions of ferroelectric axes are shown by double headed arrows 41, 42 and 43. FIG. 4 is a plan view of the first ferroelectric crystalline body and associated parts, more clearly illustrating the configuration of electrodes 17, 18 and 19.

Figure 5:
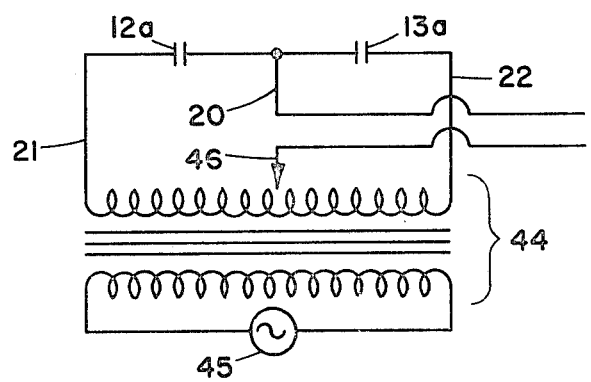
FIG. 5 is an electrical diagram of a portion (one circuit) of the device illustrated in FIGS. 1-4.

FIG. 5 illustrates the electrical circuit for comparing the capacitances 12a and 13a sensing and reference elements 12 and 13. Impedance matching transformer 44 is connected to a source, preferably less than about 1 volt (peak-to-peak), of alternating voltage 45. Movable lead 46 is adjusted so that when capacitances 12a and 13a are at the same temperature, leads 20 and 46 show zero voltage.

It is preferred that the entire apparatus as described above be encased in an airtight enclosure, which is evacuated to a low absolute pressure (preferably less than about $10^{-3}$ mm. hg.), in order to reduce the amount of convective heat leaving temperature-stabilizing element 31.

In operation, the temperature of temperature-stabilizing element 31 is established by applying an alternating voltage to leads 38 and 39. The frequency and voltage applied depend upon the particular ferroelectric material employed, the thickness of the element 31, the difference between the ambient temperature and the transition temperature of the ferroelectric material, the desired operating temperature, the temperature stability required, and the amount of thermal coupling between the temperature stabilizing element and the ambient. Temperature stabilizing devices of the general type described are known, being described for example by A. Glanc et al., J. Appl. Phys., 35, 1870-75 (1964), and V. Dvorak et al. J. Appl. Phys., 35, 1870–75 (1964). The device is known as a TANDEL (acronym for Temperature Autostabilizing Nonlinear Dielectric ELement), and details of its operation need not be repeated. The device can be stabilized at temperatures either just above or just below a transition temperature of the ferroelectric material utilized, depending on operating conditions.

After stabilization of the temperature of the temperature stabilizing element 31, the circuit illustrated in FIG. 5 is utilized to measure the magnitude of electromagnetic radiation incident upon sensing element 12. Before sensing element 12 is exposed to radiation, alternating voltage source 45 is applied and lead 46 is adjusted to yield zero voltage between leads 20 and 46. Sensing element 12 is then exposed to incident radiation, whereupon the temperature of sensing element 12 increases, capacitance 12a increases (or decreases, if the temperature of sensing element 12 is greater than the transition temperature of the ferroelectric material employed), and an alternating voltage appears between leads 20 and 46. The amplitude of this voltage is taken as a measure of the magnitude of electromagnetic radiation incident upon sensing element 12.

The construction and operation of this preferred embodiment is further illustrated by the following example.

EXAMPLE I

An electromagnetic radiation detection device was constructed as illustrated in FIGS. 1-5. Both ferroelectric crystalline bodies 11 and 31 were derived from a single growth crystal of triglycine sulfate.

The first crystalline body 11 was cut in the form of a rectangular solid with dimensions 2.9 mm. × 9.7 mm. × 0.2 mm., such that the single ferroelectric axis was substantially perpendicular to the 9.7 mm. × 0.2 mm. faces. Substantially parallel grooves 15 and 16, substantially perpendicular to the ferroelectric axis, were cut in body 11 to a depth of about 0.075 mm., using a wet string to dissolve away the crystalline material within the grooves. Body 11 was masked with metal masks, and gold was evaporated into grooves 15 and 16 to form electrodes 17, 18 and 19. The gap between electrodes 18 and 19 was about 0.5 mm.

Ferroelectric crystalline temperature stabilizing element 31 was cut in the form of a rectangular solid with dimensions 7 mm. × 12 mm. × 0.7 mm., such that the single ferroelectric axis was substantially perpendicular to the 7 mm. × 12 mm. faces. Electrodes 36 and 37 were formed by evaporating gold onto the surface of temperature stabilizing element 31.

Electrically insulating, thermally conductive sheet 34 was formed from a sheet of 0.025 mm. thick "Mylar" (trademark) film. The "Mylar" sheet was stretched over a 30-mm. inside diameter aluminum ring, and coated with a thin layer (about 5,000A.) of evaporated gold, to form electrically conductive sheet 35. Ferroelectric crystalline bodies 11 and 31 were then cemented to "Mylar" sheet 34, in the orientation shown in FIG. 1, using a thermally and electrically conductive cement (containing suspended colloidal silver). Leads 20, 21, 22, 38 and 39 were then affixed to electrodes 17, 18, 19 and 37 and gold film 35, respectively. These leads consisted of 0.1 mm. silver wire, and connections were made with electrically conductive cement. Leads 17, 18 and 19 were terminated coaxially in accordance with well-known techniques, to minimize interlead capacitance.

The sizes of electrodes 18 and 19 were next adjusted so that sensing and reference elements 12 and 13 had approximately the same capacitance (about 15.2 pf.; difference between two capacitances less than 0.1 pf.) at the same temperature (48.25° C.).

An electromagnetic radiation shield 40, constructed from 0.25 mm. brass foil which had been optically blackened with an arsenic cyanide wash, was installed over reference element 13 as shown in FIG. 1. Optional absorptive coating 23 is applied at this point if desired; in this example, no coating was employed. The entire apparatus was then encased in an airtight enclosure, which was then evacuated to an absolute pressure of about $0.5 \times 10^{14}$ mm. hg. to reduce convective thermal paths from temperature-stabilizing element 31 to the outside environment.

Temperature stabilizing element 31 was then subjected to alternating voltage of 7.2 volts between leads 38 and 39, having a frequency of 10 megacycles. Temperature stabilizing element 31 was then stabilized at a temperature of 49.135° C., or 0.115 centigrade degrees above the transition temperature of 49.02° C. which had been measured for the growth crystal from which the ferroelectric crystalline bodies 11 and 31 were derived. Sensing element 12 is then subjected to a source of electromagnetic radiation, and the voltage between leads 20 and 46 is taken as a measure of electromagnetic radiation incident upon sensing element 12.

The apparatus as thus constructed and operated was found to be a highly sensitive electromagnetic radiation detection device.

Figure 6:
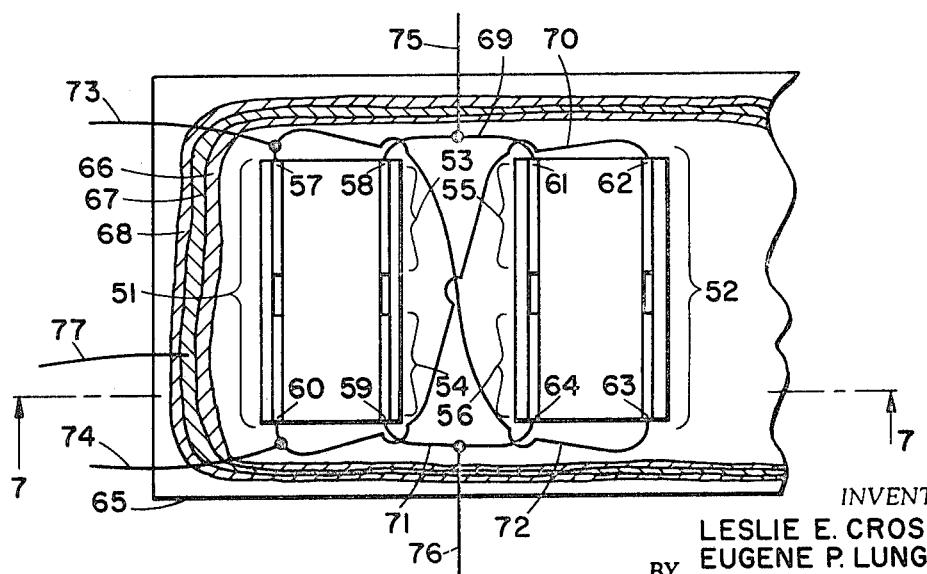
FIG. 6 is a plan view of a portion of a second preferred embodiment of the invention, in which the capacitances of four sensing elements and four reference elements are compared.

FIGS. 6-9 schematically illustrate a second preferred embodiment of the invention which is even more sensitive to electromagnetic radiation than the first embodiment. FIG. 6 is a plan view of a portion of the device. A first ferroelectric crystalline body 51, having a crystallographic transition temperature slightly below the temperature of intended temperature stabilization, comprises two sensing elements 53 and 54. A second ferroelectric crystalline body 52, having a crystallographic transition temperature slightly above the temperature of intended temperature stabilization, comprises two additional sensing elements 55 and 56. Third and fourth ferroelectric crystalline bodies (not shown) have crystallographic transition temperatures approximately equal to those of the first and second bodies 51 and 52, respectively, and comprise four reference elements corresponding to sensing elements 53-56. Eight electrodes 57-64 are connected to sending elements 53-56 as electrodes 17-19 were connected to crystalline body 11 in the previous embodiment, except that both grooves are masked to provide two electrodes per groove. Eight additional electrodes (not shown) are similarly connected to the four reference elements. The sensing and reference elements are then adjusted to all have the same capacitance within about 1 percent, preferably within about 0.1 percent, at the same temperature. Temperature-stabilizing element 65 is separated from the sensing and reference elements by electrically insulating, thermally conductive sheet 66; electrically conductive, thermally conductive sheet 67; and electrode 68. Interconnecting leads 69-72 join sensing elements of alternate ferroelectric crystalline bodies 51 and 52 as shown. Input leads 73 and 74 are connected to interconnecting leads 72 and 70 joined to electrodes 57 and 60 of different sensing elements 53 and 54 having the same transition temperature, and constitute means for applying an alternating electric field between electrodes of different sensing elements of the same ferroelectric crystalline body. Output leads 75 and 76 are connected to the other two interconnecting leads 69 and 71. Corresponding interconnecting leads, input leads, and output leads are connected in the same manner to the electrodes in the four reference elements. Lead 77 is connected to electrically conductive sheet 67.

Figure 7:
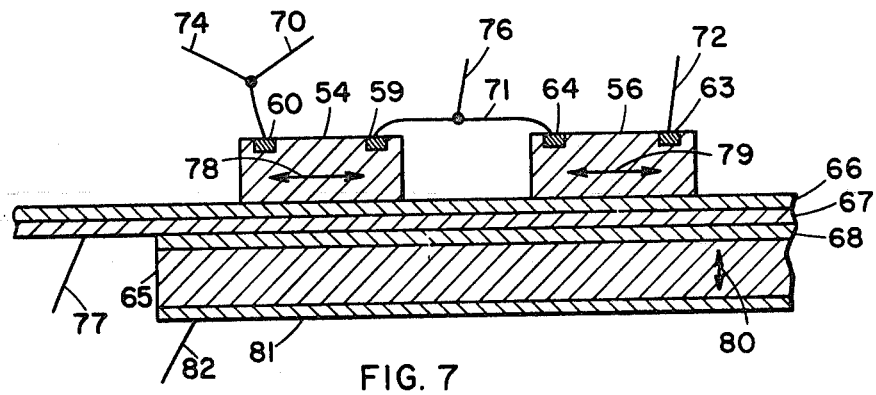
FIG. 7 is a vertical sectional view of the embodiment shown in FIG. 6, taken along line 7—7 of FIG. 6.

FIG. 7 is a vertical sectional view along line 7—7 of FIG. 6. Directions of ferroelectric axes are shown by double-headed arrows 78, 79 and 80; the orientation of the ferroelectric axes of the reference elements (not shown) is similar to that of the sensing elements. Electrode 81 adjoins temperature stabilizing element 65, and lead 82 is connected to electrode 81.

Figure 8:
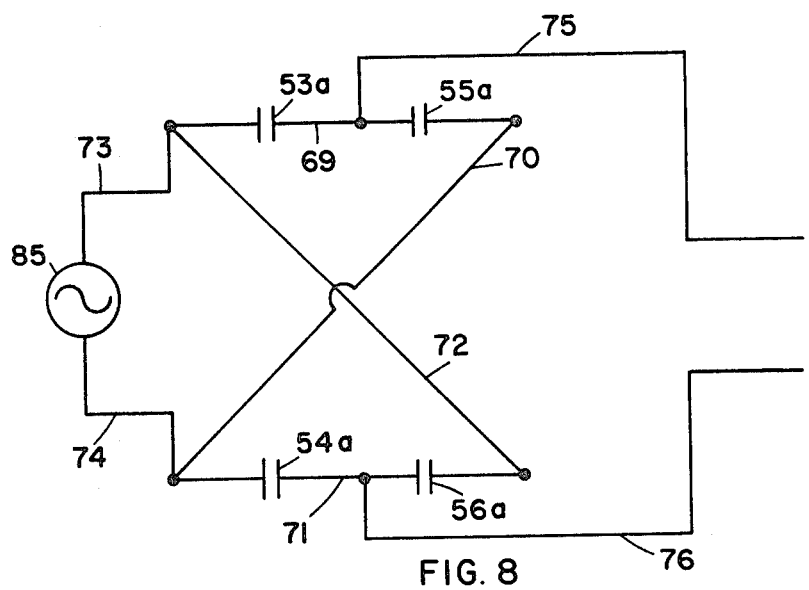
FIG. 8 is an electrical diagram of a portion of one circuit of the device illustrated in FIGS. 6-7.

FIG. 8 illustrates a portion of the electrical circuit of FIG. 6, in which sensing elements 53, 54, 55 and 56 are represented by capacitances 53a, 54a, 55a and 56a, respectively. Source of alternating voltage 85 is applied between input leads 73 and 74.

Figure 9:
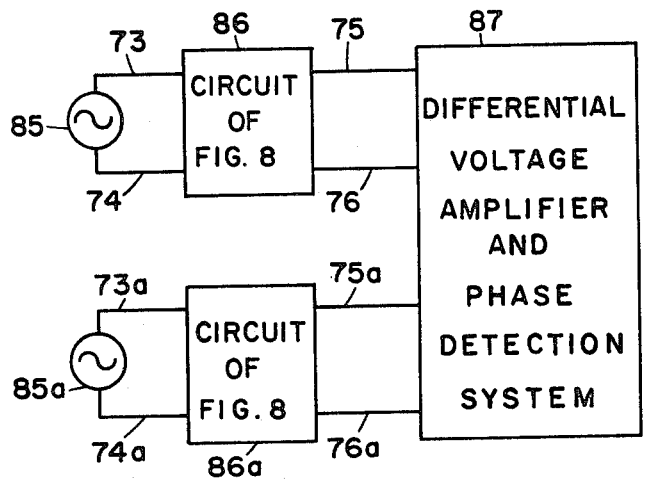
FIG. 9 is an electrical diagram of the entire circuit which is partially illustrated in FIG. 8, but omitting the detail shown in FIG. 8.

FIG. 9 illustrates the entire electrical circuit of which FIG. 8 is a portion, but omitting the detail shown in FIG. 8, which is shown as capacitance bridge 86. Input leads 73a and 74a, output leads 75a and 76a, source of alternating voltage 85a and capacitance bridge 86a represent the electrical circuitry associated with the reference elements, similar to that previously described for the sensing elements. Differential voltage amplifier and phase detection system 87 constitutes means for comparing the voltage between output leads 75 and 76 with the voltage between output leads 75a and 76a.

Unless stated otherwise or unless context so indicates, the preferred features of the first embodiment such as desirability of encasing the apparatus in an airtight enclosure which is then evacuated, preferred materials, etc., apply to the second embodiment as well.

In operation, the temperature-stabilizing element is stabilized at a temperature half way between (1) the transition temperature of sensing elements 53 and 54, and their corresponding reference elements; and (2) the transition temperature of sensing elements 55 and 56, and their corresponding reference elements. Voltages which are equal in magnitude and frequency are applied to each pair of input leads. When all four sensing elements are at an equal temperature half way between the transition temperatures of bodies 51 and 52, their capacitances will all be essentially equal, and zero voltage will appear between leads 75 and 76. When the temperature of the sensing elements is increased, the capacitances of sensing elements 53 and 54 decrease, and those of sensing elements 55 and 56 increase, as the respective elements become further from (elements 53 and 54) or closer to (elements 55 and 56) their respective transition temperatures. This imbalance in capacitances causes a voltage to appear between output leads 75 and 76, which is proportional in magnitude to the increase in temperature of the sensing elements. The voltage between output leads 75a and 76a is an analogous way a measure of the temperature of the reference elements. By comparing these two voltages, the increase in temperature due to electromagnetic radiation incident upon the sensing elements is determined, and taken as a measure of the magnitude of incident radiation.

This second preferred embodiment has the advantage that slight increases or decreases in temperature of the temperature-stabilizing element do not alter the sensitivity of the device as a whole, because as certain sensing and elements become less sensitive, their counterparts having a different transition temperature become more sensitive, and vice versa. Various modifications will be obvious to those skilled in the art, such as for example the use of additional elements having other transition temperatures, which when included within more complicated bridge circuits further stabilize the sensitivity of the device as a whole.

This second embodiment is further illustrated in the following example.

EXAMPLE 2

A temperature stabilizing element 65 is cut from a portion of triglycine sulfate having a transition temperature of 49.0° C., having dimensions 15 mm. × 20mm. × 0.7 mm. The single ferroelectric axis is substantially perpendicular to the 15 mm. × 20 mm. faces. Electrodes 68 and 81 are applied as in the previous example.

Portions of triglycine sulfate (T.G.S.) having elevated transition temperatures are prepared by including minor amounts of deuterium (in the form of "heavy water," $D_2O$) in the solutions from which the crystals of T.G.S. are grown. See Compt. Rend., 249, 1332-33 (1959). Roughly 1 percent or less of the water is replaced with $D_2O$; varying amounts are used and various crystals are grown and examined. Crystals which are found to have transition temperatures of about 49.05° C. and about 49.15° C. are selected.

Two ferroelectric crystalline bodies, each 3 mm. × 10 mm. × 0.2 mm., and with the single ferroelectric axis of each body substantially perpendicular to the 10 mm. × 0.2 mm. faces, are cut from the crystals of each transition temperature, one of each for sensing and reference purposes. The four bodies are grooved and electroded as described above.

A "Mylar" sheet 66 is coated with gold coating 67, and the five ferroelectric crystalline bodies (one temperature stabilizing element, two sensing bodies, and two reference bodies) are attached with thermally and electrically conductive cement containing suspended colloidal silver. Each pair of electrodes is adjusted so that the four sensing elements and the four reference elements all have the same capacitances within about 0.1 percent. The interconnecting, input, output and temperature stabilizing leads are then connected as described above. An electromagnetic radiation shield is installed to cover the reference elements, and a coating comprising suspended carbon black is painted on the sensing elements.

The assembled device is then enclosed in an airtight casing which is evacuated to about $5 \times 10^{-4}$ mm. hg. absolute pressure. Alternating voltage of about 10 volts, 10 megacycles is applied between leads 77 and 82, stabilizing temperature-stabilizing element 65 at 49.1° C. Equal alternating voltages of about 0.1 volt, 20 kilocycles are applied to both pairs of input leads. A conventional voltage comparison device 87 is connected to the four output leads to measure the difference in voltages between the two pairs of output leads. The device is found to be highly sensitive, and to have a highly consistent sensitivity in spite of slight variations in the temperature of temperature-stabilizing element 65.

We claim:
1. An electromagnetic radiation detection device, comprising:
  1. an electromagnetic radiation sensing component, comprising:
    a. at least one ferroelectric crystalline electromagnetic radiation sensing element,
    b. at least one ferroelectric crystalline reference element, the number of sensing and reference elements being equal, and the sensing and reference elements being composed of the same basic ferroelectric crystalline material, and
    c. means for comparing temperature dependent properties of the sensing and reference elements; and
  2. means for maintaining the sensing and reference elements within about 0.1 centigrade degrees of crystallographic transition temperatures of the sensing and reference elements.

2. An electromagnetic radiation detection device, comprising:
  1. an electromagnetic radiation sensing component, comprising:
    a. at least one ferroelectric crystalline electromagnetic radiation sensing element,
    b. at least one ferroelectric crystalline reference element, the number of sensing and reference elements being equal, and the sensing and reference elements being composed of the same basic ferroelectric crystalline material, and
    c. means for comparing temperature dependent properties of the sensing and reference elements; and
  2. means for maintaining the sensing and reference elements within about 0.1 centigrade degrees of crystallographic transition temperatures of the sensing and reference elements, said temperature-maintaining means comprising:
    a. a ferroelectric crystalline temperature-stabilizing element composed of the same basic ferroelectric crystalline material as the sensing and reference elements, the temperature-stabilizing element being electrically insulated from but thermally in contact with the sensing and reference elements; and
    b. means for subjecting the temperature-stabilizing element to an alternating electric field, in the direction of a ferroelectric axis of the temperature-stabilizing element.

3. The electromagnetic radiation detection device of claim 2, in which the temperature-dependent properties which are compared are capacitances, in the direction of ferroelectric axes, of the sensing and reference elements.

4. The electromagnetic radiation detection device of claim 2, in which the basic ferroelectric crystalline material of which the ferroelectric crystalline elements are composed has a single ferroelectric axis.

5. The electromagnetic radiation detection device of claim 2, in which the basic ferroelectric material of which the ferroelectric crystalline elements are composed is selected from the group consisting of ferroelectric materials having second order crystallographic transitions and ferroelectric materials having weak first order transitions.

6. The electromagnetic radiation detection device of claim 2, in which the basic ferroelectric crystalline material of which the ferroelectric crystalline components are composed is selected from the group consisting of triglycine sulfate, triglycine fluoberylate, and mixtures thereof.

7. The electromagnetic radiation detection device of claim 2, in which the basic ferroelectric crystalline material of which the ferroelectric crystalline components are composed is selected from the group consisting of barium niobate, strontium niobate, and mixtures thereof.

8. The electromagnetic radiation detection device of claim 2, in which the basic ferroelectric crystalline material of which the ferroelectric crystalline components are composed is potassium tartrate tetrahydrate.

9. The electromagnetic radiation detection device of claim 2, in which the basic ferroelectric crystalline material of which the ferroelectric crystalline components are composed is triglycine sulfate.

10. The electromagnetic radiation detection device of claim 2, in which the sensing and reference elements are derived from a single growth crystal.

11. The electromagnetic radiation detection device of claim 4, in which the electromagnetic radiation sensing component comprises:
1. a first ferroelectric crystalline body, comprising:
   a. a single ferroelectric crystalline electromagnetic radiation sensing element, and
   b. a single ferroelectric crystalline reference element; the sensing and reference elements being adjusted to have, in the direction of the ferroelectric axis and at the same temperature, the same capacitance within about 1 percent;
2. means for comparing the capacitances, in the direction of the ferroelectric axes, of the sensing and reference elements; and
3. means for shielding the reference element from electromagnetic radiation; the ferroelectric crystalline temperature stabilizing element constituting a second ferroelectric crystalline body.

12. The electromagnetic radiation detection device of claim 11, in which the sensing element is coated with an electromagnetic radiation absorptive and reradiating coating upon the portion of the sensing element exposed to incident electromagnetic radiation.

13. The electromagnetic radiation detection device of claim 4, in which the electromagnetic radiation sensing component comprises:
1. a first ferroelectric crystalline body, having a crystallographic transition temperature slightly below the temperature of intended temperature stabilization of the ferroelectric crystalline temperature-stabilizing element and comprising a first sensing element and a second sensing element;
2. a second ferroelectric crystalline body, having a crystallographic transition temperature slightly above the temperature of intended temperature stabilization of the ferroelectric crystalline temperature-stabilizing element, and comprising third and fourth sensing elements;
3. a third ferroelectric crystalline body, having a crystallographic transition temperature approximately equal to that of the first ferroelectric crystalline body, and comprising a first reference element and a second reference element;
4. a fourth ferroelectric crystalline body, having a crystallographic transition temperature approximately equal to that of the second ferroelectric crystalline body, and comprising third and fourth reference elements;
5. sixteen electrodes, a pair of electrodes being connected to each sensing element and each reference element, each electrode being approximately perpendicular to the ferroelectric axis of the ferroelectric crystalline material employed, and each pair of electrodes being of such size and position that the capacitances of the eight sensing and reference elements are equal within about 1 percent;
6. means for electrically connecting:
   a. a first electrode of the first sensing element to a first electrode of the third sensing element;
   b. the second electrode of the third sensing element to a first electrode of the second sensing element;
   c. the second electrode of the second sensing element to a first electrode of the fourth sensing element;
   d. the second electrode of the fourth sensing element to the second electrode of the first sensing element;
   e. a first electrode of the first reference element to a first electrode of the third reference element;
   f. the second electrode of the third reference element to a first electrode of the second reference element;
   g. the second electrode of the second reference element to a first electrode of the fourth reference element; and
   h. the second electrode of the fourth reference element to the second electrode of the first reference element;
7. means for applying a first alternating electric field between:
   a. the first electrode of the first sensing element, and
   b. the second electrode of the second sensing element;
8. means for applying a second alternating electric field, substantially equal in voltage to the first alternating electric field, between:
   a. the first electrode of the first reference element, and
   b. the second electrode of the second reference element; and
9. means for comparing:
   a. the voltage between
      i. the second electrode of the first sensing element, and
      ii. the first electrode of the second sensing element, with
   b. the voltage between
      i. the second electrode of the first reference element, and
      ii. the first electrode of the second reference element; the ferroelectric crystalline temperature stabilizing element constituting a fifth ferroelectric crystalline body.

14. The electromagnetic radiation detection device of claim 13, in which the ferroelectric crystalline components are all derived from the same basic ferroelectric crystalline material, the basic ferroelectric crystalline material being selected from the group consisting of ferroelectric materials having second order crystallographic transitions and ferroelectric materials having weak first order transitions.

15. The electromagnetic radiation detector of claim 14, in which the ferroelectric crystalline components having varying crystallographic transition temperatures comprise varying amounts compositional inclusions.

16. The electromagnetic radiation detector of claim 14, in which the basic ferroelectric material contains hydrogen, and in which the ferroelectric crystalline components having varying crystallographic transition temperatures comprise varying amounts of deuterium.

17. The electromagnetic radiation detector of claim 13, in which the first and third ferroelectric crystalline bodies are portions of a first ferroelectric growth crystal; and in which the second and fourth ferroelectric crystalline bodies are portions of a second ferroelectric growth crystal.

18. The electromagnetic radiation detection device of claim 17, in which the sensing elements are coated with an electromagnetic radiation absorptive and reradiating coating upon the portions of the sensing elements exposed to incident electromagnetic radiation.

19. A process for measuring the magnitude of electromagnetic radiation, comprising the steps of simultaneously
1. subjecting at least one ferroelectric crystalline electromagnetic radiation sensing element to a source of electromagnetic radiation to be measured;
2. stabilizing the temperature of the electromagnetic radiation sensing elements and an equal number of ferroelectric crystalline reference elements, the reference elements being of the same basic ferroelectric crystalline material as the sensing elements, within about 0.1 centigrade degrees of crystallographic transition temperatures of the sensing and reference elements; and
3. comparing temperature dependent properties of the sensing and reference elements.

20. A process for measuring the magnitude of electromagnetic radiation, comprising the steps of simultaneously
1. subjecting at least one ferroelectric crystalline electromagnetic radiation sensing element to a source of electromagnetic radiation to be measured;
2. stabilizing the temperature of the electromagnetic radiation sensing elements and an equal number of ferroelectric crystalline reference elements, the reference elements being of the same basic ferroelectric crystalline material as the sensing elements, within about 0.1 centigrade degrees of crystallographic transition temperatures of the sensing and reference elements; and
3. comparing temperature dependent properties of the sensing and reference elements; said temperature being stabilized by subjecting ferroelectric crystalline temperature stabilizing element to an alternating electric field in a direction of a ferroelectric axis, the temperature stabilizing element consisting of the same basic ferroelectric crystalline material as the sensing and reference elements, and the temperature stabilizing element being electrically insulated from but thermally in contact with the sensing and reference elements.

21. The process of claim 20, in which the properties of the sensing and reference elements which are compared are the capacitances, in the direction of a ferroelectric axis, of the sensing and reference elements.